(12) United States Patent
Kobayashi et al.

(10) Patent No.: US 7,630,421 B2
(45) Date of Patent: Dec. 8, 2009

(54) LASER BEAM IRRADIATION APPARATUS AND LASER WORKING MACHINE

(75) Inventors: Yutaka Kobayashi, Ota-ku (JP); Kouichi Nehashi, Ota-ku (JP)

(73) Assignee: Disco Corporation, Tokyo (JP)

( * ) Notice: Subject to any disclaimer, the term of this patent is extended or adjusted under 35 U.S.C. 154(b) by 26 days.

(21) Appl. No.: 11/888,487

(22) Filed: Aug. 1, 2007

(65) Prior Publication Data
US 2008/0031291 A1  Feb. 7, 2008

(30) Foreign Application Priority Data
Aug. 4, 2006  (JP) .............................. 2006-212840

(51) Int. Cl.
*H01S 3/13*  (2006.01)
(52) U.S. Cl. .................. 372/29.012; 250/205
(58) Field of Classification Search ............ 372/29.012; 250/205
See application file for complete search history.

(56) References Cited

U.S. PATENT DOCUMENTS

| | | | | |
|---|---|---|---|---|
| 3,863,262 A | * | 1/1975 | Crofut et al. ................. | 396/549 |
| 4,198,675 A | * | 4/1980 | Moore ......................... | 702/124 |
| 4,827,125 A | * | 5/1989 | Goldstein .................... | 250/234 |
| 6,246,046 B1 | * | 6/2001 | Landers et al. .............. | 250/216 |
| 2004/0262529 A1 | * | 12/2004 | Yoshida et al. .............. | 250/372 |
| 2007/0138156 A1 | * | 6/2007 | Nomaru et al. ........ | 219/121.73 |

FOREIGN PATENT DOCUMENTS

| | | |
|---|---|---|
| JP | 2003-163323 | 6/2003 |
| JP | 2005-362236 | 12/2005 |

* cited by examiner

*Primary Examiner*—Minsun Harvey
*Assistant Examiner*—Joshua King
(74) *Attorney, Agent, or Firm*—Greer, Burns & Crain, Ltd.

(57) ABSTRACT

A laser beam irradiation apparatus includes an oscillation unit, an acousto-optic deflection unit for deflecting a laser beam oscillated by the oscillation unit, a condenser for condensing the deflected laser beam, and a control unit. The control unit determines an actual output power of the laser beam based on a light reception signal received from laser beam output detection means in response to a control signal for controlling a deflection angle adjustment unit of the deflection unit. Then, the control unit arithmetically operates the ratio of an actual output power corresponding to the control signal with reference to the lowest value of the actual output power. Further, the control unit arithmetically operates a correction value corresponding to the ratio of the actual output power to produce a control map and controls the output adjustment unit based on the control map.

2 Claims, 12 Drawing Sheets

FIG.4

| | | | | | | | | | | | (V) |
|---|---|---|---|---|---|---|---|---|---|---|---|
| 10V | 0 | 0.1 | 0.1 | 0.2 | 0.2 | 0.3 | 0.3 | 0.2 | 0.2 | 0.1 | 0 |
| | 0.1 | 0.5 | 0.6 | 0.7 | 0.8 | 0.9 | 0.9 | 0.8 | 0.8 | 0.5 | 0.1 |
| | 0.1 | 0.6 | 1.3 | 1.4 | 1.5 | 1.5 | 1.4 | 1.4 | 1.3 | 0.5 | 0.1 |
| | 0.1 | 0.7 | 1.3 | 1.6 | 2.0 | 2.0 | 1.9 | 1.8 | 1.4 | 0.6 | 0.1 |
| | 0.1 | 0.8 | 1.4 | 1.8 | 2.6 | 2.5 | 2.5 | 1.9 | 1.4 | 0.6 | 0.1 |
| 5V | 0.2 | 0.8 | 1.4 | 1.9 | 2.5 | 3.0 | 2.5 | 1.9 | 1.5 | 0.6 | 0.2 |
| | 0.2 | 0.8 | 1.4 | 1.9 | 2.5 | 2.5 | 2.5 | 1.9 | 1.4 | 0.7 | 0.1 |
| | 0.1 | 0.7 | 1.4 | 1.8 | 1.9 | 1.9 | 1.9 | 1.9 | 1.3 | 0.7 | 0.1 |
| | 0.1 | 0.7 | 1.4 | 1.4 | 1.4 | 1.4 | 1.4 | 1.3 | 1.3 | 0.7 | 0.1 |
| | 0.1 | 0.7 | 0.7 | 0.7 | 0.8 | 0.8 | 0.8 | 0.7 | 0.7 | 0.6 | 0.1 |
| 0 | 0.1 | 0.1 | 0.1 | 0.1 | 0.1 | 0.2 | 0.2 | 0.1 | 0.1 | 0.1 | 0.1 |

Second deflection angle adjustment means 0    5V    10V

First deflection angle adjustment means

LASER BEAM IRRADIATION APPARATUS AND LASER WORKING MACHINE

BACKGROUND OF THE INVENTION

1. Field of the Invention

The present invention relates to a laser beam irradiation apparatus configured to irradiate a laser beam on a work and a laser working machine which includes the laser beam irradiation apparatus.

2. Description of the Related Art

In a semiconductor device fabrication process, a plurality of regions are defined by division plan lines called streets arranged in a grid-like fashion on the surface of a semiconductor wafer having a substantial disk shape, and devices such as an IC, an LSI, and so forth are formed on the sectioned regions. Then, the semiconductor wafer is cut along the division plan lines so that the regions in which the devices are formed are divided to fabricate individual semiconductor chips. In order to implement downsizing and higher functionalization of an apparatus, a module structure in which a plurality of semiconductor chips are laminated and electrodes of the laminated semiconductor chips are connected to each other has been placed into practical use. As disclosed, for example, in Japanese Patent Laid-open No. 2003-163323, the module structure is configured such that a through-hole (via hole) is formed at a portion of a semiconductor wafer at which an electrode is formed and a conductive material to be connected to the electrode such as aluminum is filled in the through-hole (via hole).

The through-hole (via hole) provided in the semiconductor wafer described above is formed by means of a drill. However, since the diameter of the through-hole (via hole) provided in the semiconductor wafer is as small as 100 to 300 μm, there is a problem that, where a drill is used to form a hole, the productivity is low. In order to eliminate the problem described above, the assignee of the present application has proposed a laser working apparatus which can effectively form a fine hole in a work such as a semiconductor wafer or the like in Japanese Patent Application No. 2005-64867. The laser working apparatus includes working feeding amount detection means configured to detect a relative working feeding amount between a chuck table for holding a work and laser beam irradiation means, and storage means configured to store X and Y coordinate values of a pore formed on the work. The laser working apparatus further includes control means configured to control the laser beam irradiation means based on the X and Y coordinate values of the fine hole stored in the storage means and a detection signal from the working feeding amount detection means. The laser working apparatus is configured such that a one-pulse laser beam is irradiated if the X and Y coordinate values of the fine hole formed in the work indicate a position just below a condenser of the laser beam irradiation means.

However, while it is necessary, in order to form a fine hole in a work, for a pulse laser beam to be irradiated on the same portion by a plural number of times, where the laser working apparatus described above is used, the movement of the work must be performed by a plural number of times. Therefore, the laser working apparatus is not necessarily satisfactory from a point of view of the productivity. Further, it is preferable to form a plurality of laser working grooves on a work only if working feeding is performed without performing indexing feeding of the work in an indexing feeding direction (Y-axis direction) orthogonal to a working feeding direction (X-axis direction).

In order to satisfy such a demand as just described, the assignee of the present application has proposed a laser working apparatus in Japanese Patent Application No. 2005-362236. The laser working apparatus includes laser beam irradiation means having acousto-optic deflection means in which an acousto-optic device is used, and deflects a laser beam oscillated by laser beam oscillation means when it passes the acousto-optic device so that the laser beam is irradiated at the same working position while performing working feeding of a work. However, the laser working apparatus has a problem that, if a laser beam is deflected by an acousto-optic device, then since the diffraction efficiency differs depending upon the deflection angle and makes the output of the laser beam different, uniform working cannot be achieved.

SUMMARY OF THE INVENTION

Therefore, it is an object of the present invention to provide a laser beam irradiation apparatus and a laser working machine which allow uniform working even if a laser beam is deflected by acousto-optic deflection means.

In accordance with an aspect of the present invention, there is provided a laser beam irradiation apparatus, including laser beam oscillation means configured to oscillate a laser beam, acousto-optic deflection means configured to deflect the laser beam oscillated by the laser beam oscillation means, a condenser configured to condense the laser-beam deflected by the acousto-optic deflection means, the acousto-optic deflection means including an acousto-optic device configured to deflect the optical axis of the laser beam oscillated by the laser beam oscillation means, a RF oscillator configured to apply a RF to the acousto-optic device, deflection angle adjustment means configured to adjust the frequency of the RF to be outputted from the RF oscillator, output adjustment means configured to adjust the amplitude of the RF to be produced by the RF oscillator, and control means configured to control the deflection angle adjustment means and the output adjustment means, and laser beam output detection means including a beam splitter disposed between the acousto-optic device and the condenser and configured to split part of the laser beam deflected by the acousto-optic device and a light reception device configured to receive the laser beam split by the beam splitter, the laser beam output detection means sending a light reception signal received by the light reception device to the control means, the control means being capable of determining an actual output power of the laser beam based on the light reception signal sent thereto from the laser beam output detection means in response to a control signal for controlling the deflection angle adjustment means, arithmetically operating the ratio of an actual output power corresponding to the control signal with reference to the lowest value of the actual output power, arithmetically operating a correction value corresponding to the ratio of the actual output power to produce a control map and controlling the output adjustment means based on the control map.

With the configuration described above, the control means determines an actual output power of the laser beam based on a light reception signal sent thereto from the laser beam output detection means in response to a control signal for controlling the deflection angle adjustment means. Further, the control means arithmetically operate the ratio of an actual output power corresponding to the control signal with reference to the lowest value of the actual output. Further, the control means arithmetically operates a correction value corresponding to the ratio of the actual output power to produce a control map and controls the output adjustment means based on the control map. Therefore, the actual outputs deflected by the acousto-optic device become equal to each other even if the diffraction efficiency by the acousto-optic device varies, and uniform working can be performed for all of irradiation positions of the pulse laser beam.

Preferably, the acousto-optic deflection means includes first and second acousto-optic deflection means configured to deflect the laser beam oscillated by the laser beam oscillation means to directions orthogonal to each other.

In accordance with another aspect of the present invention, there is provided a laser working machine, including a chuck table configured to hold a work, a laser beam irradiation apparatus configured to irradiate a laser beam on the work held by the chuck table, working feeding means configured to relatively move the chuck table and the laser beam irradiation apparatus in a working feeding direction which is an X-axis direction, and indexing feeding means configured to relatively move the chuck table and the laser beam irradiation apparatus in an indexing feeding direction which is a Y-axis direction orthogonal to the working feeding direction which is the X-axis direction, the laser beam irradiation apparatus being formed from a laser beam irradiation apparatus described hereinabove.

The above and other objects, features and advantages of the present invention and the manner of realizing them will become more apparent, and the invention itself will best be understood, from a study of the following description and appended claims with reference to the attached drawings showing some preferred embodiments of the invention.

BRIEF DESCRIPTION OF THE DRAWINGS

FIG. 4 is a control map of a correction voltage produced based on the actual output map illustrated in FIG. 3;

DETAILED DESCRIPTION OF THE PREFERRED EMBODIMENTS

Figure 1:
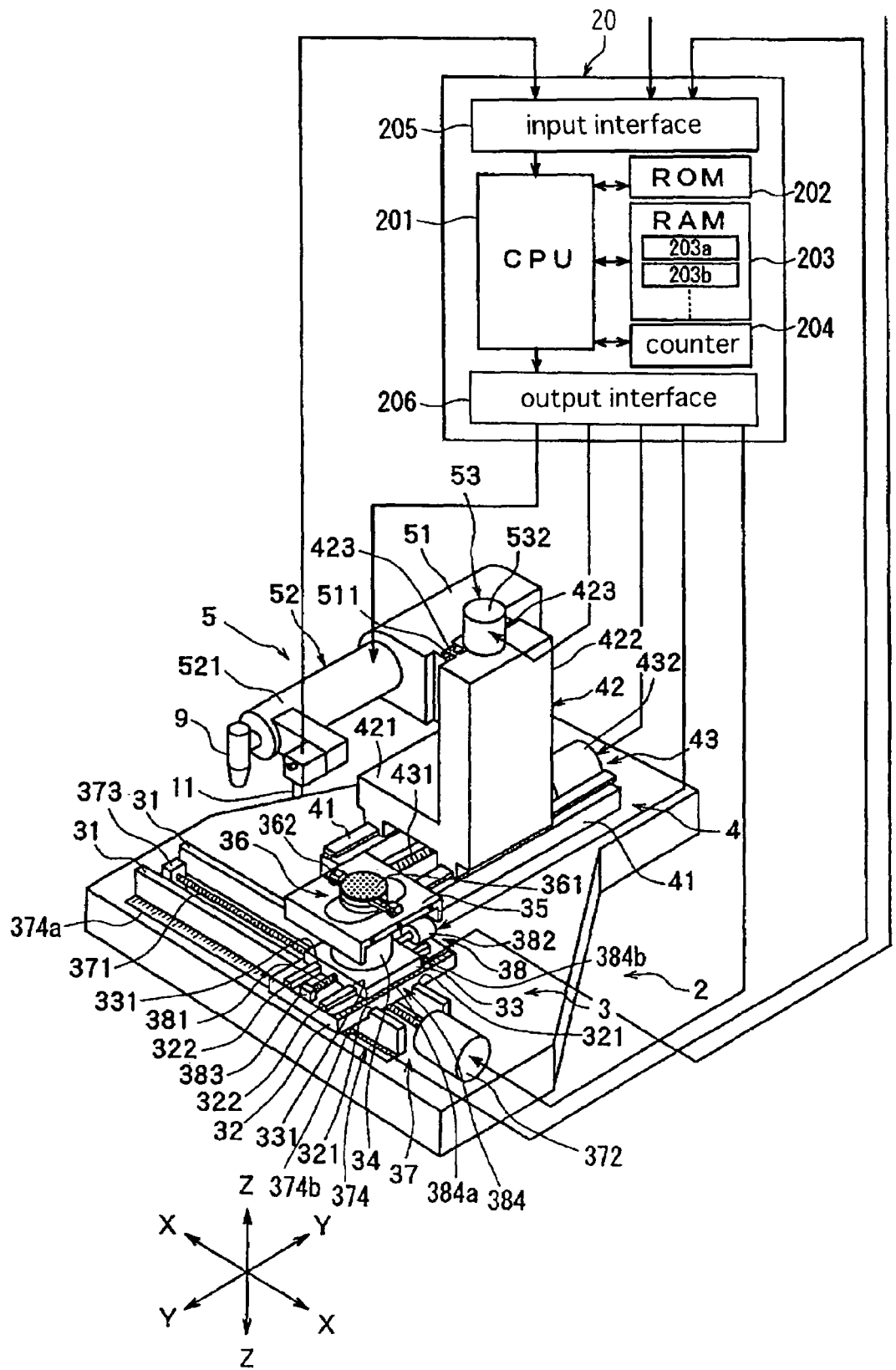
FIG. 1 is a perspective view of a laser working machine configured in accordance with the present invention.

In the following, preferred embodiments of a laser beam irradiation apparatus and a laser working machine configured in accordance with the present invention are described in more detail with reference to the accompanying drawings. FIG. 1 is a perspective view showing a laser working machine configured in accordance with the present invention. The laser working machine shown in FIG. 1 includes a stationary platform 2, and a chuck table mechanism 3 disposed for movement in a working feeding direction (X-axis direction) indicated by an arrow mark X on the stationary platform 2 and configured to hold a work. The laser working machine further includes a laser beam irradiation unit supporting mechanism 4 disposed for movement in an indexing feeding direction (Y-axis direction) indicated by an arrow mark Y orthogonal to the direction (X-axis direction) indicated by the arrow mark X on the stationary platform 2. The laser working machine further includes a laser beam irradiation unit 5 disposed for movement in a direction (Z-axis direction) indicated by an arrow mark Z on the laser beam unit supporting mechanism 4.

The chuck table mechanism 3 includes a pair of guide rails 31 disposed in parallel to each other along the working feeding direction (X-axis direction) indicated by the arrow mark X on the stationary platform 2, and a first sliding block 32 disposed for movement in the working feeding direction (X-axis direction) indicated by the arrow mark X on the guide rails 31. The chuck table mechanism 3 further includes a second sliding block 33 disposed for movement in the indexing feeding direction (Y-axis direction) indicated by the arrow mark Y on the first sliding block 32, and a cover table 35 supported on the second sliding block 33 by a cylindrical member 34. The chuck table mechanism 3 further includes a chuck table 36 as work supporting means. The chuck table 36 includes an adsorption chuck 361 formed from a porous material and supports, for example, a disk-shaped semiconductor wafer which is a work on the adsorption chuck 361 by sucking means not shown. The chuck table configured in such a manner as described above is rotated by a step motor not shown disposed in the cylindrical member 34. It is to be noted that a clamp 362 for fixing an annular frame hereinafter described is disposed on the chuck table 36.

A pair of guide grooves 321 are provided on a bottom face of the first sliding block 32 so as to fit with the guide rails 31 described above, and a pair of guide rails 322 are formed on the top face of the first sliding block 32 and extend in parallel to each other along the indexing feeding direction (Y-axis direction) indicated by the arrow mark Y. The first sliding block 32 having such a configuration as described above is mounted for movement in the working feeding direction (X-axis direction) indicated by the arrow mark X along the paired guide rails 31 with the guide grooves 321 thereof fitted with the guide rails 31. The chuck table mechanism 3 in the embodiment shown in FIG. 1 includes working feeding means 37 for moving the first sliding block 32 in the working feeding direction (X-axis direction) indicated by the arrow mark X along the guide rails 31.

The working feeding means 37 includes driving sources such as an external thread rod 371 disposed in parallel between the guide rails 31, a step motor 372 for driving the external thread rod 371 to rotate and so forth. The external thread rod 371 is supported at an end thereof for rotation on a bearing block 373 fixed to the stationary platform 2 described above and is connected at the other end thereof for motion transmission to an output power shaft of the step motor 372. It is to be noted that the external thread rod 371 is screwed in a through internal thread hole formed in an internal thread block not shown provided in a projecting manner on the bottom face at a central portion of the first sliding block 32. Accordingly, if the external thread rod 371 is driven to rotate forwardly and reversely by the step motor 372, then the first sliding block 32 is moved in the working feeding direction (X-axis direction) indicated by the arrow mark X along the guide rails 31.

The laser working machine in the embodiment shown in FIG. 1 includes working feeding amount detection means 374 configured to detect a working feeding amount of the chuck table 36. The working feeding amount detection means 374 includes a linear scale 374a disposed along the guide rail 31 and a reading head 374b disposed on the first sliding block 32 for movement along the linear scale 374a together with the first sliding block 32. The reading head 374b of the working feeding amount detection means 374 in the embodiment shown in FIG. 1 sends a pulse signal of 1 pulse to control means hereinafter described by every 1 μm. The control means hereinafter described counts the inputted pulse signal to detect a working feeding amount of the chuck table 36.

It is to be noted that, where the step motor 372 is used as a driving source for the working feeding means 37, the working feeding amount of the chuck table 36 can be detected also by counting a driving pulse of the control means hereinafter described which outputs the driving signal to the step motor 372. On the other hand, where a servo motor is used alternatively as a driving source for the working feeding means 37, the working feeding amount of the chuck table 36 can be detected also by sending a pulse signal outputted from a rotary encoder which detects the number of rotations of the servo motor to the control means hereinafter described so that the control means counts the pulse signal inputted from the control means.

A pair of guide grooves 331 are provided on the bottom face of the second sliding block 33 so as to individually fit with the guide rails 322 provided on the top face of the first sliding block 32. The guide grooves 331 and the guide rails 322 fit with each other such that the second sliding block 33 can move in the indexing feeding direction (Y-axis direction) indicated by the arrow mark Y. The chuck table mechanism 3 in the embodiment shown in FIG. 1 includes first indexing feeding means 38 configured to move the second sliding block 33 in the indexing feeding direction (Y-axis direction) indicated by the arrow mark Y along the guide rails 322 provided on the first sliding block 32.

The first indexing feeding means 38 includes driving sources such as an external thread rod 381 disposed in parallel to each other between the guide rails 322, a step motor 382 for driving the external thread rod 381 to rotate, and so forth. The external thread rod 381 is supported at an end thereof for rotation on a bearing block 383 fixed to the top face of the first sliding block 32 and is connected at the other end thereof for motion transmission to an output power shaft of the step motor 382. It is to be noted that the external thread rod 381 is screwed in a through internal thread hole formed in an internal thread block not shown provided in a projecting manner on the bottom face at a central portion of the second sliding block 33. Accordingly, if the external thread rod 381 is driven to rotate forwardly and reversely by the step motor 382, then the second sliding block 33 is moved in the indexing feeding direction (Y-axis direction) indicated by the arrow mark Y along the guide rails 322.

The laser working machine in the embodiment shown in FIG. 1 includes indexing feeding amount detection means 384 for detecting an indexing and working feeding amount of the second sliding block 33. The indexing feeding amount detection means 384 includes a linear scale 384a disposed along the guide rail 322 and a reading head 384b disposed on the second sliding block 33 for movement along the linear scale 384a together with the second sliding block 33. The reading head 384b of the feeding amount detection means 384 sends a pulse signal of 1 pulse to the control means hereinafter described for every 1 μm in the embodiment in FIG. 1. Then, the control means hereinafter described counts the inputted pulse signal to detect an indexing feeding amount of the chuck table 36.

It is to be noted that, where the step motor 382 is used as a driving source for the first indexing feeding means 38, the indexing feeding amount of the chuck table 36 can be detected also by counting a driving pulse of the control means hereinafter described which outputs the driving signal to the step motor 382. On the other hand, where a servo motor is used as a driving source for the first indexing feeding means 38, the indexing feeding amount of the chuck table 36 can be detected also by sending a pulse signal outputted from a rotary encoder which detects the number of rotations of the servo motor to the control means hereinafter described so that the control means counts the pulse signal inputted thereto.

The laser beam irradiation unit supporting mechanism 4 includes a pair of guide rails 41 disposed in parallel to each other along the indexing feeding direction (Y-axis direction) indicated by the arrow mark Y on the stationary platform 2 and a movable supporting platform 42 disposed for movement in the direction indicated by the arrow mark Y on the guide rails 41. The movable supporting platform 42 includes moving supporting means 421 disposed for movement on the guide rails 41 and mounting means 422 mounted on the moving supporting means 421. A pair of guide rails 423 are provided in parallel to each other on one side face of the mounting means 422 and extends in the direction (Z-axis direction) indicated by the arrow mark Z. The laser beam irradiation unit supporting mechanism 4 in the embodiment shown in FIG. 1 includes second indexing feeding means 43 for moving the movable supporting platform 42 in the indexing feeding direction (Y-axis direction) indicated by the arrow mark Y along the paired guide rails 41.

The second indexing feeding means 43 includes driving sources such as an external thread rod 431 disposed in parallel between the paired guide rails 41, a step motor 432 for driving the external thread rod 431 to rotate, and so forth. The external thread rod 431 is supported at an end thereof for rotation on a bearing block not shown fixed to the stationary platform 2 and is connected at the other end thereof for motion transmission to an output power shaft of the step motor 432. It is to be noted that the external thread rod 431 is screwed in an internal thread hole formed in an internal thread block not shown provided in a projecting manner on the bottom face at a central portion of the moving supporting means 421 which forms the movable supporting platform 42. Therefore, if the external thread rod 431 is driven to rotate forward and reverse by the step motor 432, then the movable supporting platform 42 is moved in the indexing feeding direction (Y-axis direction) indicated by the arrow mark Y along the guide rails 41.

The laser beam irradiation unit 5 in the embodiment shown in FIG. 1 includes a unit holder 51 and a laser beam irradiation apparatus 52 mounted on the unit holder 51. The unit holder 51 has a pair of guide grooves 511 which fit for sliding motion with the guide rails 423 provided on the mounting means 422 and is supported for movement in the direction (Z-axis direction) indicated by the arrow mark Z with the guide grooves 511 thereof fit the guide rails 423.

The laser beam irradiation unit 5 in the embodiment shown in FIG. 1 includes moving means 53 for moving the unit holder 51 in the direction (Z-axis direction) indicated by the arrow mark Z along the guide rails 423. The moving means 53 includes driving sources such as an external thread rod (not shown) disposed between the guide rails 423, a step motor 532 for driving the external thread rod to rotate, and so forth. In the moving means 53, the step motor 532 drives the external thread rod not shown to rotate forward and reverse to the unit holder 51 and the laser beam irradiation apparatus 52 in the direction (Z-axis direction) indicated by the arrow mark Z along the guide rails 423. It is to be noted that, in the embodiment shown in FIG. 1, when the step motor 532 rotates forward, the laser beam irradiation apparatus 52 moves upward, but when the step motor 532 rotates in reverse, the laser beam irradiation apparatus 52 moves downward.

Figure 2:
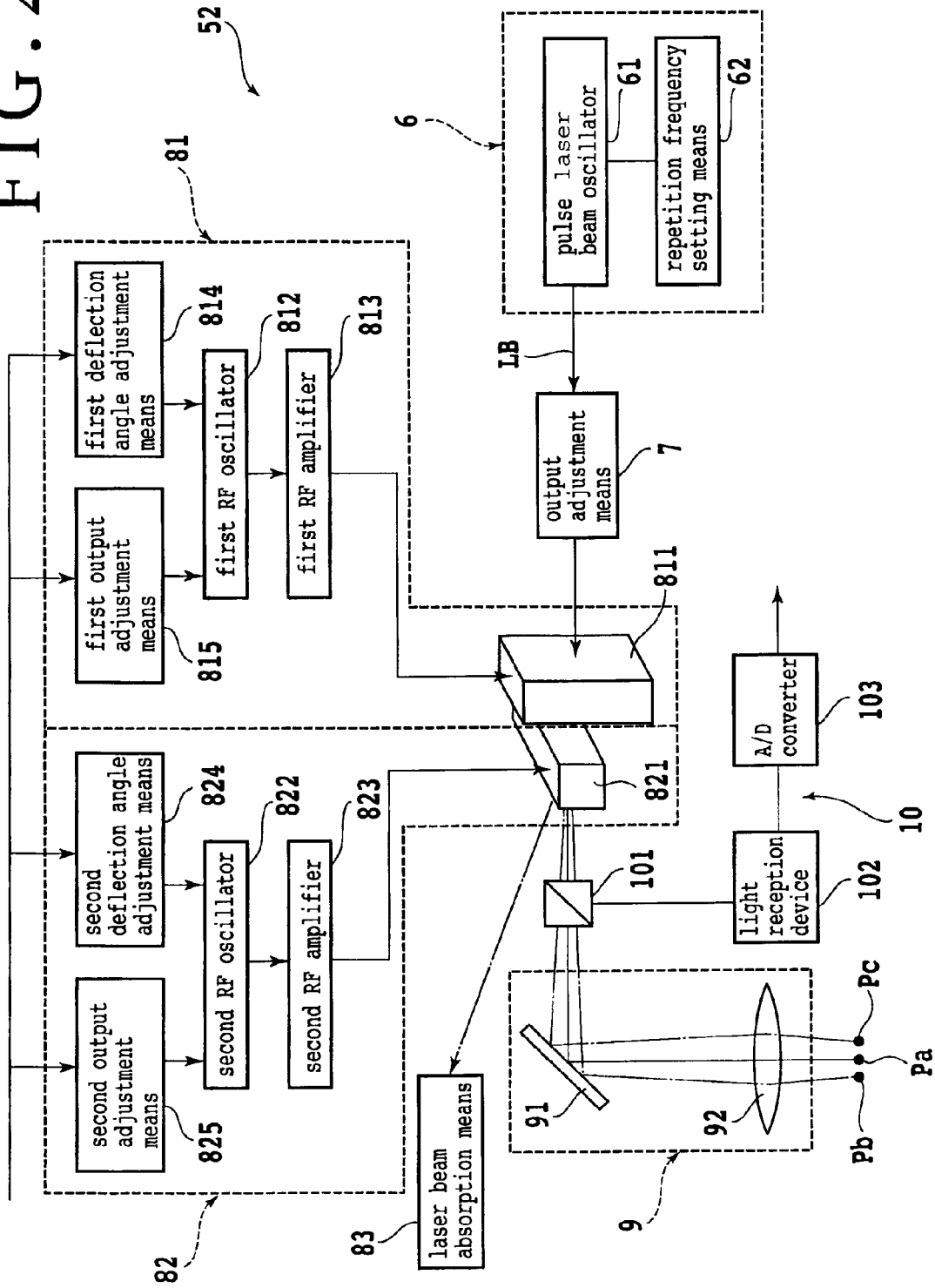
FIG. 2 is a block diagram of a laser beam irradiation apparatus installed in the laser working machine shown in FIG. 1.

The laser beam irradiation apparatus 52 includes a cylindrical casing 521 arranged substantially horizontally, a pulse laser beam oscillation means 6 disposed in the casing 521 as seen in FIG. 2, and output adjustment means 7. The laser beam irradiation apparatus 52 further includes a first acousto-optic deflection means 81 for deflecting a laser beam oscillated from the pulse laser beam oscillation means 6 to the working feeding direction (X-axis direction). The laser beam irradiation apparatus 52 further includes a second acousto-optic deflection means 82 for deflecting the laser beam oscillated by the laser beam oscillation means 6 to the indexing feeding direction (Y-axis direction). The laser beam irradiation apparatus 52 further includes a condenser 9 for irradiating a pulse laser beam passing through the first and second acousto-optic deflection means 81 and 82 on the work held on the chuck table 36.

The pulse laser beam oscillation means 6 includes a pulse laser beam oscillator 61 formed from a YAG laser oscillator or a YVO4 laser oscillator and repetition frequency setting means 62 provided for the pulse laser beam oscillator 61. The output adjustment means 7 adjusts the output power of a pulse laser beam LB oscillated from the pulse laser beam oscillation means 6 to predetermined output power.

The first acousto-optic deflection means 81 includes a first acousto-optic device 811 for deflecting the laser beam oscillated from the laser beam oscillation means 6 to the working feeding direction (X-axis direction). The first acousto-optic deflection means 81 further includes a first RF oscillator 812 for generating a RF (radio frequency) signal to be applied to the first acousto-optic device 811, and a first RF amplifier 813 for amplifying the power of the RF signal generated by the first RF oscillator 812 applying the amplified power to the first acousto-optic device 811. The first acousto-optic deflection means 81 further includes first deflection angle adjustment means 814 for adjusting the frequency of the RF signal to be generated by the first RF oscillator 812, and first output adjustment means 815 for adjusting the amplitude of the RF signal to be generated by the first RF oscillator 812. The first acousto-optic device 811 can adjust the deflection angle of the laser beam in response to the frequency of the applied RF signal and can adjust the output power of the laser beam in response to the amplitude of the applied RF signal. It is to be noted that the first deflection angle adjustment means 814 and the first output adjustment means 815 are controlled by the control means hereinafter described.

The second acousto-optic deflection means 82 includes a second acousto-optic device 821 for deflecting the laser beam oscillated from the laser beam oscillation means 6 to the indexing feeding direction (Y-axis direction: a vertical direction with respect to the plane to the plane on FIG. 2) orthogonal to the working feeding direction (X-axis direction). The second acousto-optic deflection means 82 includes further includes a second RF oscillator 822 for generating a RF signal to be applied to the second acousto-optic device 821, and a second RF amplifier 823 for amplifying the power of the RF signal generated by the second RF oscillator 822 and applying the amplifier power to the second acousto-optic device 821. The second acousto-optic deflection means 82 further includes second deflection angle adjustment means 824 for adjusting the frequency of the RF signal to be generated by the second RF oscillator 822, and second output adjustment means 825 for adjusting the amplitude of the RF signal to be generated by the second RF oscillator 822. The second acousto-optic device 821 can adjust the deflection angle of the laser beam in response to the frequency of the applied RF signal and can adjust the output power of the laser beam in response to the amplitude of the applied RF signal. It is to be noted that the second deflection angle adjustment means 824 and the second output adjustment means 825 are controlled by the control means hereinafter described.

The laser beam irradiation apparatus 52 in the embodiment shown in FIG. 1 includes laser beam absorption means 83 for absorbing, as indicated by a broken line in FIG. 2, the laser beam deflected by the first acousto-optic device 811 where the RF signal having a predetermined frequency is applied to the first acousto-optic device 811. The condenser 9 is mounted at an end of the casing 521 and includes a direction changing mirror 91 for changing changing the direction of the pulse laser beam deflected by the first and second acousto-optic deflection means 81 and 82 to a downward direction. The condenser 9 further includes a condensing lens 92 for condensing the laser beam whose direction is changed by the direction changing mirror 91.

The pulse laser beam irradiation apparatus 52 in the embodiment shown in FIG. 1 is configured in such a manner as described above, and operation thereof is described below with reference to FIG. 2. For example, if a voltage of 5 V is applied to the first deflection angle adjustment means 814 of the first acousto-optic deflection means 81 and a RF signal having a frequency corresponding to 5 V is applied to the first acousto-optic device 811, then a pulse laser beam oscillated from the pulse laser beam oscillation means 6 is deflected as indicated by a solid line in FIG. 2. Consequently, the pulse laser beam is condensed at a condensing point Pa. On the other hand, for example, if another voltage of 10 V is applied to the first deflection angle adjustment means 814 and a RF having the frequency corresponding to 10 V is applied to the first acousto-optic device 811, then the pulse laser beam oscillated from the pulse laser beam oscillation means 6 is deflected as indicated by an alternate long and short dash line in FIG. 2. Consequently, the pulse laser beam is condensed at another condensing point Pb displaced to the left in the working feeding direction (X-axis direction) by a predetermined amount in FIG. 2 from the condensing point Pa.

The laser beam irradiation apparatus 52 in the embodiment shown in FIG. 1 further includes laser beam output detection means 10 for detecting the output power of the pulse laser beam deflected by the first and second acousto-optic deflection means 81 and 82. The laser beam output detection means 10 includes a beam splitter 101 disposed between the first and second acousto-optic deflection means 81 and 82 and the condenser 9 for splitting part of the laser beam deflected by the first and second acousto-optic deflection means 81 and 82. The laser beam output detection means 10 further includes a light reception device 102 for receiving the laser beam split by the beam splitter 101 and sends a light reception signal received by the light reception device 102 to the control means hereinafter described through an A/D converter 103.

The pulse laser beam irradiation apparatus 52 in the embodiment shown in FIG. 1 is configured in such a manner as described above, and operation thereof is described below with reference to FIG. 2. For example, if a voltage of 5 V is applied to the first deflection angle adjustment means 814 of the first acousto-optic deflection means 81 and a RF signal having a frequency corresponding to 5 V is applied to the first acousto-optic device 811, then a pulse laser beam oscillated from the pulse laser beam oscillation means 6 is deflected as indicated by a solid line in FIG. 2. Consequently, the pulse laser beam is condensed at a condensing point Pa. On the other hand, for example, if another voltage of 10 V is applied to the first deflection angle adjustment means 814 and a RF having the frequency corresponding to 10 V is applied to the first acousto-optic device 811, then the pulse laser beam oscillated from the pulse laser beam oscillation means 6 is deflected as indicated by an alternate long and short dash line in FIG. 2. Consequently, the pulse laser beam is condensed at another condensing point Pb displaced to the left in the working feeding direction (X-axis direction) by a predetermined amount in FIG. 2 from the condensing point Pa.

In contrast, for example, if a further voltage of 0 V is applied to the first deflection angle adjustment means 814 and a RF having the frequency corresponding to 0 V is applied to the first acousto-optic device 811, then the pulse laser beam oscillated from the pulse laser beam oscillation means 6 is deflected as indicated by an alternate long and two short dashes line in FIG. 2. Consequently, the pulse laser beam is condensed at a further condensing point Pc displaced to the right in the working feeding direction (X-axis direction) by a predetermined amount in FIG. 2 from the condensing point Pa. On other hand, for example, if a still further voltage of 15 V is applied to the first deflection angle adjustment means 814 of the first acousto-optic deflection means 81 and a RF signal having the frequency corresponding to 15 V is applied to the first acousto-optic device 811, then the pulse laser beam oscillated from the pulse laser beam oscillation means 6 is guided to the laser beam absorption means 83 as indicated by a broken line in FIG. 2. In this manner, the laser beam is deflected by the first acousto-optic device 811 to the working feeding direction (X-axis direction) in response to the voltage applied to the first deflection angle adjustment means 814.

It is to be noted that, also in the second acousto-optic deflection means 82, if the voltage to be applied to the second deflection angle adjustment means 824 and the frequency of a RF signal to be applied to the second acousto-optic device 821 is adjusted similarly as in the first acousto-optic deflection means 81, then the pulse laser beam oscillated from the pulse laser beam oscillation means 6 can be deflected to the indexing feeding direction (Y-axis direction: a vertical direction with respect to the plane on FIG. 2) orthogonal to the working feeding direction (X-axis direction).

Now, operation of the laser beam output detection means 10 is described. A laser beam passing through the first and second acousto-optic deflection means 81 and 82 is split by the beam splitter 101. In the embodiment shown in FIG. 1, 99% of the laser beam is directed to the first acousto-optic deflection means 81 while the remaining 1% is directed to the light reception device 102. The light reception device 102 having received 1% of the laser beam split by the beam splitter 101 outputs a voltage signal corresponding to the received light intensity. The voltage signal is converted into a digital signal by the A/D converter 103 and sent to the control means hereinafter described.

Referring back to FIG. 1, the laser working machine in the embodiment shown in FIG. 1 includes image pickup means 11 disposed at a front end portion of the casing 521 and configured to detect a working area for which laser working is to be performed by the laser beam irradiation apparatus 52. The image pickup means 11 includes, in addition to an ordinary image pickup element (CCD element) for picking up an image using a visible light beam, infrared irradiation means configured to irradiate infrared rays upon a work. The image pickup means 11 further includes an optical system configured to catch the infrared rays irradiated by the infrared irradiation means, another image pickup element (infrared CCD element) configured to output an electric signal corresponding to the infrared rays caught by the optical system, and so forth. The image pickup means 11 sends the image signal of a result of the image pickup to the control means hereinafter described.

Further, referring to FIG. 1, the laser working machine in the embodiment shown in FIG. 1 further includes control means 20. The control means 20 is formed from a computer and includes a central processing unit (CPU) 201 for performing an arithmetic operation process in accordance with a control program, a read-only memory (ROM) 202 in which the control program and so forth are stored, and a re-loadable random access memory (RAM) 203 for storing data of design values of a work hereinafter described, results of arithmetic operation and so forth. The control means 20 further includes a counter 204, an input interface 205, and an output interface 206. The input interface 205 is connected to receive detection signals from the working feeding amount detection means 374, indexing feeding amount detection means 384, light reception device 102 and image pickup means 11 of the laser beam output detection means 10, and so forth.

Meanwhile, the output interface 206 of the control means 20 outputs control signals to the pulse laser beam oscillation means 6, output adjustment means 7, first deflection angle adjustment means 814, and first output adjustment means 815 of the first acousto-optic deflection means 81, second deflection angle adjustment means 824 and second output adjustment means 825 of the second acousto-optic deflection means 82, and so forth. It is to be noted that the random access memory (RAM) 203 includes a first storage region 203a for storing data of design values of a work hereinafter described, a second storage region 203b for storing a control hereinafter described, and other storage regions.

The laser working machine in the embodiment shown in FIG. 1 is configured in such a manner as described above, and operation thereof is described below. In order to carry out laser working, the control means 20 renders the laser beam irradiation apparatus 52 operative to carry out an actual output detection step of determining an actual output power of the pulse laser beam oscillated by the pulse laser beam oscillation means 6. In particular, the control means 20 determines an actual output power of the pulse laser beam deflected by the first acousto-optic device 811 of the first acousto-optic deflection means 81 and the second acousto-optic device 821 of the second acousto-optic deflection means 82 from the luminous intensity of the pulse laser beam received by the light reception device 102 of the laser beam output detection means 10. The actual output power differs depending upon the deflection angles of the pulse laser beam deflected by the first acousto-optic device 811 and the second acousto-optic device 821 and is represented as seen in FIG. 3.

Figure 3:
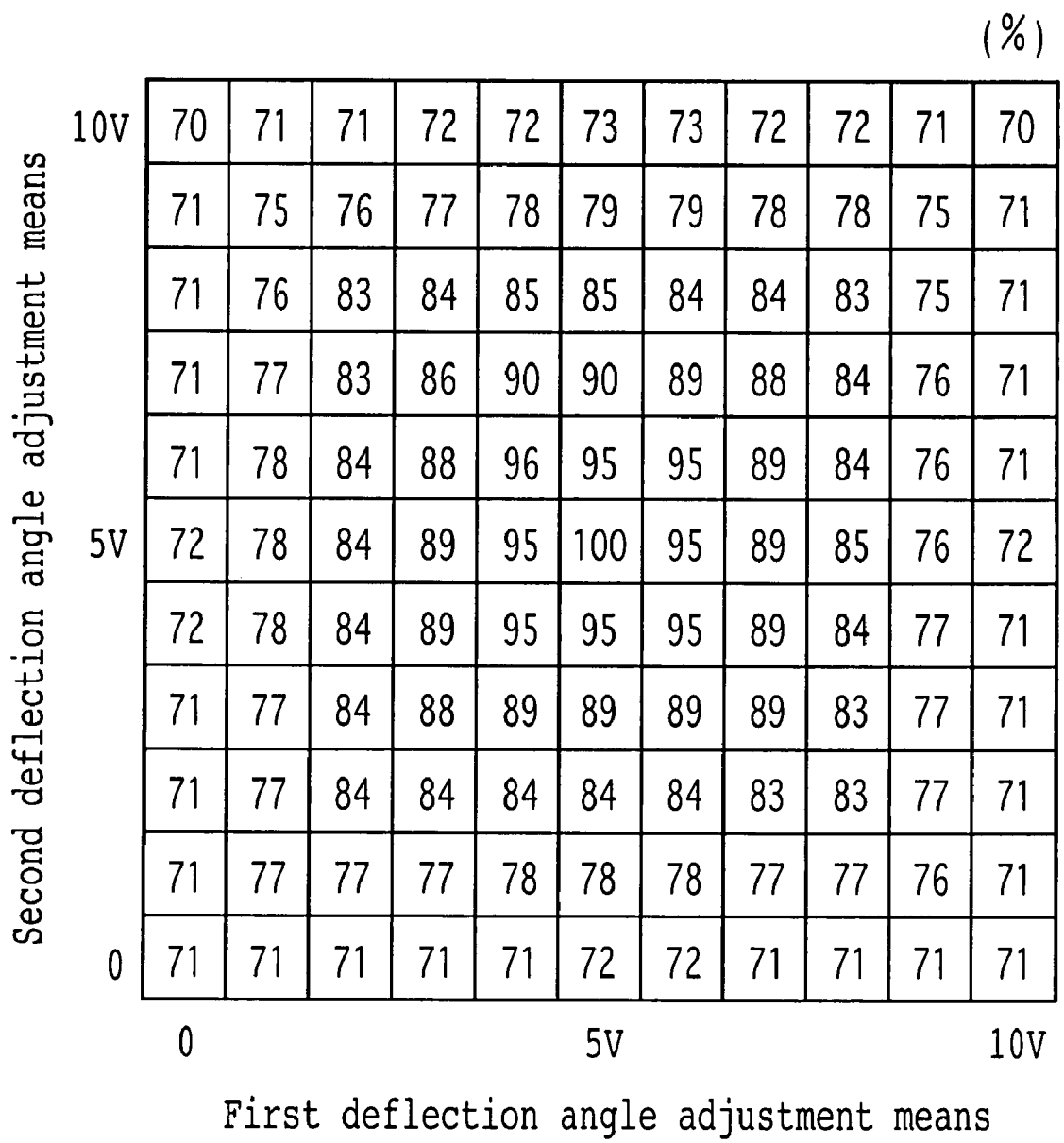
FIG. 3 is a map illustrating an actual output of a pulse laser beam deflected by first and second acousto-optic deflection means which form the laser beam irradiation apparatus shown in FIG. 2.

In the map shown in FIG. 3, the axis of abscissa indicates the voltage applied to the first deflection angle adjustment means 814 of the first acousto-optic deflection means 81, and the axis of ordinate indicates the voltage applied to the second deflection angle adjustment means 824 of the second acousto-optic deflection means 82. The map thus indicates the ratio (%) of the actual output power corresponding to the voltages applied to the first deflection angle adjustment means 814 and the second acousto-optic deflection means 82. It is to be noted that the ratio (%) of the actual output power in FIG. 3 is indicated by a value where the output power of the pulse laser beam received by the light reception device 102 of the laser beam output detection means 10 when a voltage of 5 V is applied to the first deflection angle adjustment means 814 and the second deflection angle adjustment means 824 is represented as 100%.

Since the actual output power of the pulse laser beam deflected by the first acousto-optic device 811 and the second acousto-optic device 821 varies depending upon the voltage applied to the first deflection angle adjustment means 814 of the first acousto-optic deflection means 81 and the voltage applied to the second deflection angle adjustment means 824 of the second acousto-optic deflection means 82, in order to uniformize the actual output power of the pulse laser beam to be deflected by the first acousto-optic device 811 and the second acousto-optic device 821, it is necessary to adjust the actual output power to a minimum output power. In the map illustrated in FIG. 3, the minimum output power is 70%. Therefore, the correction is performed so that all actual output powers may be 70%. As this correction, the voltage to be applied to the first output adjustment means 815 of the first acousto-optic deflection means 81 or the second output adjustment means 825 of the second acousto-optic deflection means 82 is adjusted.

It is to be noted that, according to the map shown in FIG. 3, if the voltage applied to the first output adjustment means 815 or the second output adjustment means 825 is 0 V, then the actual output power of the pulse laser beams deflected by the first acousto-optic device 811 and the second acousto-optic device 821 does not vary. However, if a voltage of 0.1 V is applied to the first output adjustment means 815 or the second output adjustment means 825, then the actual output power of the pulse laser beam deflected by the first acousto-optic device 811 and the second acousto-optic device 821 decreases, for example, by 1%.

FIG. 4 shows an example of a control map in which the voltage to be applied to the first output adjustment means 815 of the first acousto-optic deflection means 81 or the second output adjustment means 825 of the second acousto-optic deflection means 82 is set with reference to the minimum actual output power (Pmin: 70%) of the pulse laser beam deflected by the first acousto-optic device 811 and the second acousto-optic device 821 illustrated in FIG. 3. Accordingly, within any deflection region in which the actual output power is 70% as seen in FIG. 3, the control means 20 sets the voltage to be applied to the first output adjustment means 815 or the second output adjustment means 825 to 0 V. Then, the control means 20 arithmetically operates a correction voltage (Va) to be applied to the first output adjustment means 815 or the second output adjustment means 825 within each deflection region (P0) as seen in FIG. 4 (Va=(P0−Pmin)×0.1 V). After the voltage to be applied to the first output adjustment means 815 or the second output adjustment means 825 in each deflection region is set in this manner, the control means 20 stores the control map illustrated in FIG. 4 into the second storage region 203b of the random access memory (RAM) 203.

Figure 5:
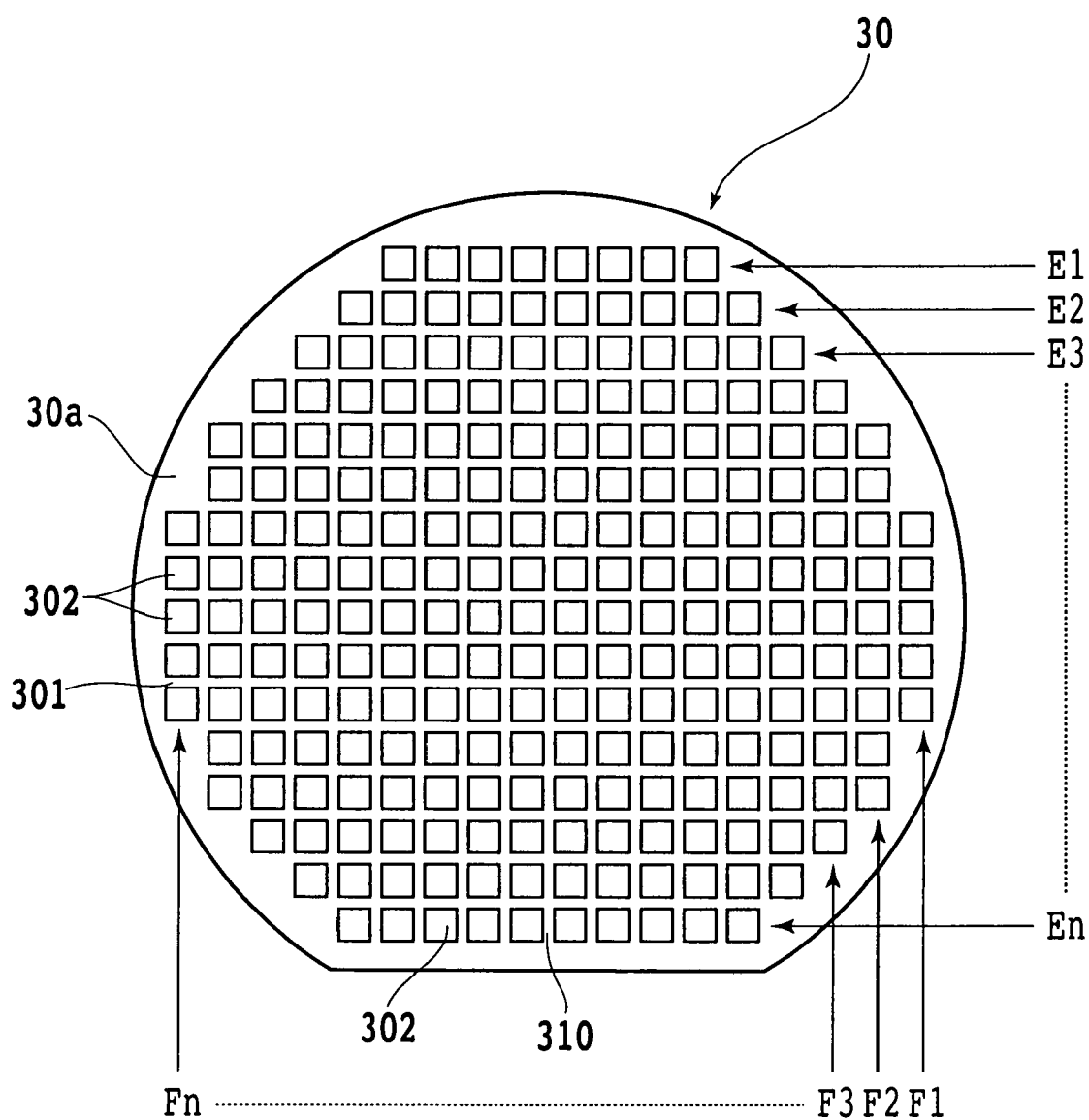
FIG. 5 is a top plan view of a semiconductor wafer as a work.
Figure 6:
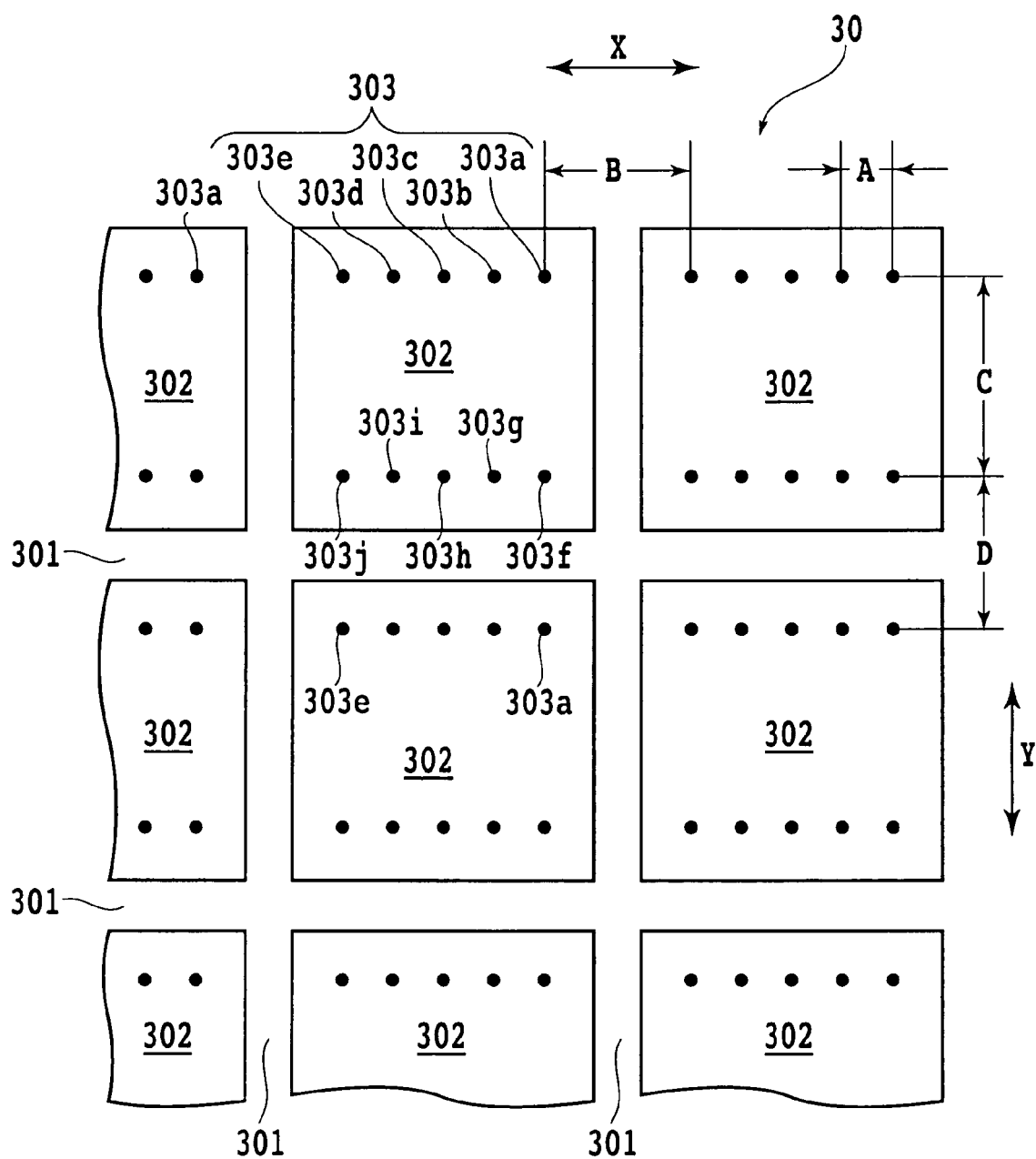
FIG. 6 is a top plan view showing, in an enlarged scale, part of the semiconductor wafer shown in FIG. 5.

Now, a working method of perforating a laser work hole in a work using the laser working machine described above is described. FIG. 5 shows a plan view of a semiconductor wafer 30 as a work to be laser-worked. Referring to FIG. 5, the semiconductor wafer 30 shown is a silicon wafer and has a plurality of regions defined by a plurality of division plan lines 301 disposed in a grid-like fashion on the front face 30a of the semiconductor wafer 30. A device 302 such as an IC or an LSI is formed in each of the defined regions. All of the devices 302 have a same configuration. A plurality of electrodes 303 (303a to 303j) are formed on the surface of each device 302 as seen in FIG. 6. It is to be noted that electrodes 303a and 303f, 303b and 303g, 303c and 303h, 303d and 303i, or 303e and 303j are positioned at the same position in the X direction. At the positions of the electrodes 303 (303a to 303j), working holes (via holes) are formed such that they extend from the rear face 10b of the electrodes 303.

In the arrangement shown in FIG. 6, the distance As between the electrodes 303 (303a to 303j) on each device 302 in the X direction (leftward and rightward direction in FIG. 6) and the distance Bs between adjacent ones of the electrodes 303 formed on the devices 302 across each division plan line 301 in the X direction (leftward and rightward direction in FIG. 6), that is, between the electrode 303e and the electrode 303a, are set equal to each other. Further, in the arrangement shown in FIG. 6, the distance C between the electrodes 303 (303a to 303j) on each device 302 in the Y direction (upward and downward direction in FIG. 6) and the distance C between adjacent ones of the electrodes 303 formed on the devices 302 across each division plan line 301 in the Y direction (upward and downward direction in FIG. 6), that is, between the electrode 303f and the electrode 303a and 303j, are set equal to each other. Data of design values for the number of devices 302 disposed in the rows E1, . . . , En and the columns F1, . . . , Fn shown in FIG. 5 and the distances A, B, C, and D of the semiconductor wafer 30 having such a configuration as described above are stored in the first storage region 203a of the random access memory (RAM) 203 described hereinabove.

Figure 7:
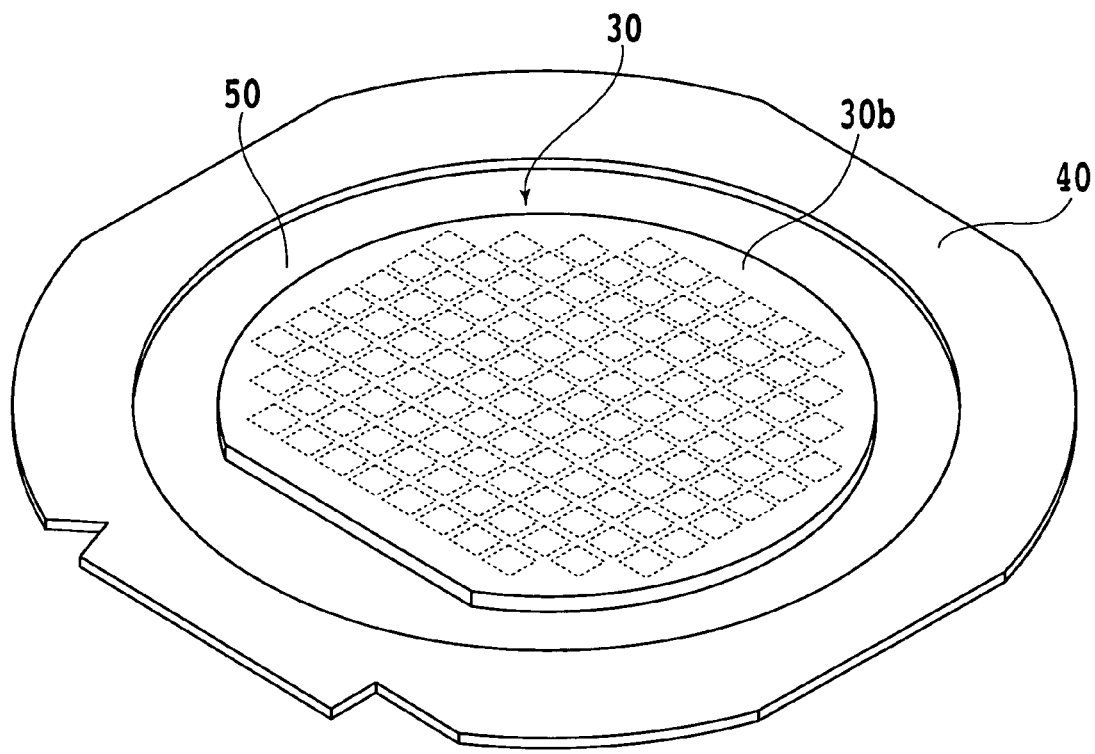
FIG. 7 is a perspective view showing the semiconductor wafer shown in FIG. 5 in a state that it is mounted on the surface of a protective tape mounted on an annular frame.

Laser working in which the laser working machine described above is used to form work holes (via holes) at the positions of the electrodes 303 (303a to 303j) of the devices 302 formed on the semiconductor wafer 30 is described. The semiconductor wafer 30 configured in such a manner as described above is adhered, at the surface 30a thereof, to a protective tape 50 formed from a synthetic resin sheet of polyolefin or the like mounted on an annular frame 40 as seen in FIG. 7. Accordingly, the rear face 30b of the semiconductor wafer 30 is directed upwardly. The semiconductor wafer 30 supported on the frame 40 with the protective tape 50 interposed therebetween in this manner is placed, at the protective tape 50 side thereof, on the chuck table 36 of the laser working apparatus shown in FIG. 1. Then, the sucking means not shown is rendered operative to cause the semiconductor wafer 30 to be attracted to and held by the chuck table 36 with the protective tape 50 positioned therebetween. Further, the annular frame 40 is fixed by the clamp 362.

The chuck table 36 to and by which the semiconductor wafer 30 is attracted and held as described hereinabove is positioned immediately below the image pickup means 11 by the working feeding means 37. Where the chuck table 36 is positioned immediately below the image pickup means 11, the semiconductor wafer 30 on the chuck table 36 is positioned at a coordinate position shown in FIG. 8. In this state, an alignment work of detecting whether or not the grid-like division plan lines 301 formed on the semiconductor wafer 30 held on the chuck table 36 are disposed in parallel to each other in both of the X-axis direction and the Y-axis direction.

In particular, an image of the semiconductor wafer 30 held on the chuck table 36 is picked up by the image pickup means 11, and an image process such as pattern matching is executed for the picked up image to perform an alignment work. At this time, while the front face 30a of the semiconductor wafer 30 on which the division plan lines 301 are formed is positioned on the lower side, since the image pickup means 11 includes image pickup means composed of infrared irradiation means, an optical system for catching infrared rays, an image pickup device (infrared CCD), and so forth as described above, an image of the division plan lines 301 can be picked up through the rear face 30b of the semiconductor wafer 30.

Then, the chuck table 36 is moved so that the device 302 at the leftmost end in FIG. 8 in the uppermost row E1 of the devices 302 formed on the semiconductor wafer 30 is positioned immediately below the image pickup means 11. Further, the left upper electrode 303a in FIG. 8 among the electrodes 303 (303a to 303j) formed on the device 302 is positioned immediately below the image pickup means 11. If, in this state, the image pickup means 11 detects the electrode 303a, then the coordinate value (a1) of the electrode 303a is sent as a first working feeding start position coordinate value to the control means 20. The semiconductor wafer 30 stores the coordinate value (a1) as the first working feeding start position coordinate value into the random access memory (RAM) 203 (working feeding start position detection step). At this time, since the image pickup means 11 and the condenser 9 of the laser beam irradiation apparatus 52 are disposed in a predetermined spaced relationship from each other, the sum value of the X coordinate value and the distance between the image pickup means 11 and the condenser 9 is stored.

Figure 8:
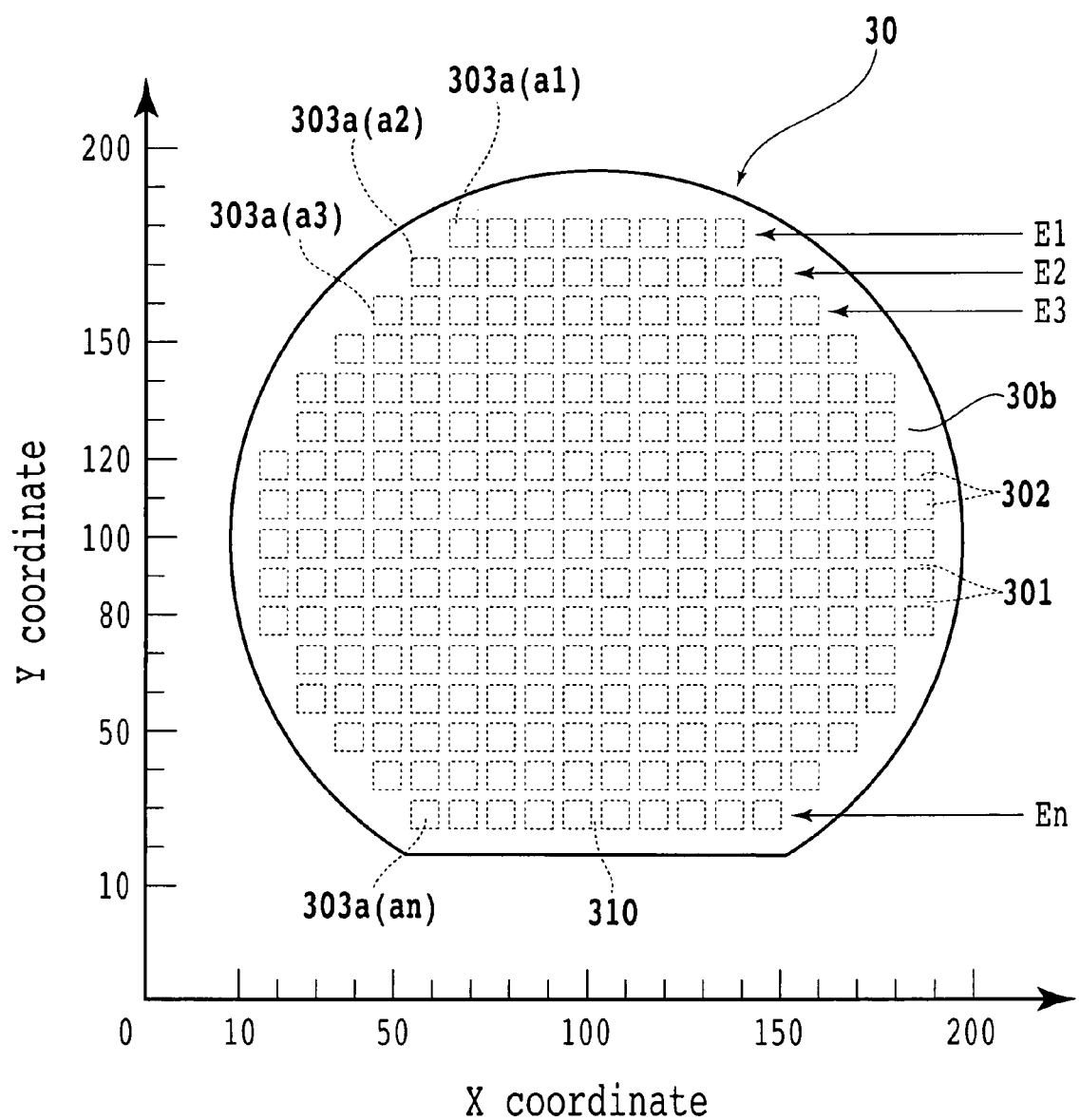
FIG. 8 is a diagrammatic view illustrating a relationship of the semiconductor wafer shown in FIG. 5 to coordinates in a state that the semiconductor wafer is held at a predetermined position of a chuck table of the laser working apparatus shown in FIG. 1.

After the first working feeding start position coordinate value (a1) of the device 302 in the uppermost row E1 in FIG. 8 is detected in this manner, the chuck table 36 is fed for indexing by the distance between the division plan lines 301 in the Y-axis direction and is moved in the X-axis direction until the left upper electrode 303a in FIG. 8 among the electrodes 303 (electrode 303a to 303j) formed on the devices 302 is positioned immediately below the image pickup means 11. If the electrode 303a is detected by the image pickup means 11 in this state, then the detected coordinate value (a2) is sent as a second working feeding start position coordinate value to the control means 20. The control means 20 stores the coordinate value (a2) as the second working feeding start position coordinate value into the random access memory (RAM) 203.

At this time, since the image pickup means 11 and the condenser 9 of the laser beam irradiation apparatus 52 are disposed in a spaced relationship by a predetermined distance from each other in the X-axis direction as described hereinabove, the sum value of the X coordinate value and the distance between the image pickup means 11 and the condenser 9 is stored. Thereafter, the control means 20 repetitively executes the indexing feeding and the working feeding start position detection step described above up to the lowermost row En at the lowermost position in FIG. 8. Thus, the control means 20 detects the working feeding start position coordinate values (a3 to an) of the devices 302 formed in the rows and stores the detected working feeding start position coordinate values into the random access memory (RAM) 203.

Figure 9A:
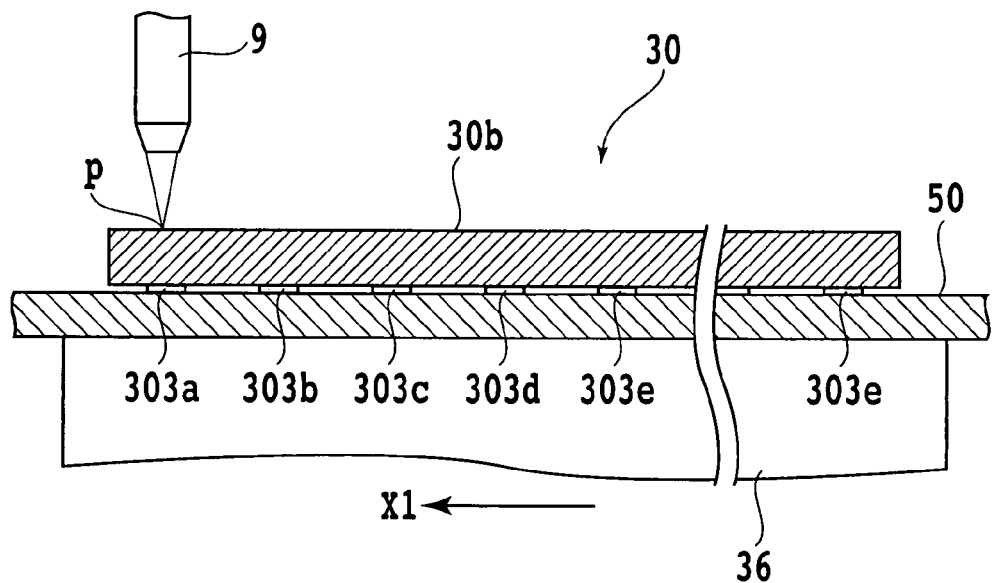
FIGS. 9A and 9B are explanatory views showing a perforation process carried out by the laser working machine shown in FIG. 1.

Thereafter, a perforation step of perforating a laser work hole (via hole) at each of the positions the electrodes 303 (303a to 303j) formed on the devices 302 of the semiconductor wafer 30 is carried out. At the perforation step, the working feeding means 37 is rendered operative to move the chuck table 36 until the first working feeding start position coordinate value (a1) stored in the A/D converter 103 is positioned immediately below the condenser 9 of the laser beam irradiation apparatus 52. In FIG. 9A, the first working feeding start position coordinate value (a1) is shown positioned immediately below the condenser 9 in this manner. Then, the control means 20 controls the working feeding means 37 to perform working feeding of the chuck table 36 at a predetermined moving speed in the direction indicated by an arrow mark X1 in FIG. 9A from the position illustrated in FIG. 9A. Simultaneously, the control means 20 renders the laser beam irradiation apparatus 52 operative to cause the condenser 9 to irradiate a pulse laser beam for a predetermined period of time.

It is to be noted that the condensed light point P of the laser beam irradiated from the condenser 9 is adjusted to a position in the proximity of the surface 30a of the semiconductor wafer 30. At this time, the control means 20 outputs control signals to the first deflection angle adjustment means 814 and the first output adjustment means 815 of the first acousto-optic deflection means 81 based on the detection signal from the reading head 374b of the working feeding amount detection means 374 within the predetermined period of time within which the pulse laser beam is irradiated. In particular, the control means 20 outputs a signal within a range from 0 to 10 V to the first deflection angle adjustment means 814 and outputs a control signal of a correction voltage based on the control map illustrated in FIG. 4 to the first output adjustment means 815. It is to be noted that, since, at the perforation process illustrated in FIGS. 9A and 9B, the pulse laser beam is not deflected to the Y-axis direction, a voltage of 5 V is applied to the second deflection angle adjustment means 824 of the second acousto-optic deflection means 82. Further, in the process illustrated in FIGS. 9A and 9B, since the correction voltage is applied to the first output adjustment means 815, no correction voltage is applied to the second output adjustment means 825 of the second acousto-optic deflection means 82.

Meanwhile, the first RF oscillator 812 outputs a RF signal corresponding to the control signals from the first deflection angle adjustment means 814 and the first output adjustment means 815. The power of the RF signal outputted from the first RF oscillator 812 is amplified by the first RF amplifier 813 and applied to the first acousto-optic device 811. Also the second RF oscillator 822 outputs a RF signal corresponding to the control signals from the second deflection angle adjustment means 824 and the second output adjustment means 825. The power of the RF signal outputted from the second RF oscillator 822 is amplified by the second RF amplifier 823 and applied to the second acousto-optic device 821. As a result, the first acousto-optic device 811 and the second acousto-optic device 821 deflect the pulse laser beam oscillated from the pulse laser beam oscillation means 6 within a range from a position indicated by an alternate long and short dash line to an alternate long and two short dashes line in FIG. 2.

An example of working conditions at the perforation step is given below.

| | |
|---|---|
| Light source: | LD excited Q switch Nd: YVO4 |
| Wavelength: | 355 nm |
| Cycle frequency: | 50 kHz |
| Average output power: | 5 W |
| Condensed spot diameter: | φ15 μm |
| Working feeding speed: | 300 mm/sec |

If the perforation step is carried out in the conditions specified above, then a laser work hole of approximately 5 μm in depth can be formed per one pulse of the laser beam on the silicon wafer. Accordingly, in order to form a work hole which extends to an electrode 303 in the silicon wafer of 50 μm thick, it is necessary to irradiate the pulse laser beam for a period of time corresponding to 10 pulses. Therefore, a work hole extending up to an electrode 303 can be formed by irradiating the pulse laser beam by 10 pulses at the first working feeding start position coordinate value (a1) of the semiconductor wafer 30 held on the chuck table 36 which is moving at the working feeding speed of 300 mm/sec in the conditions specified above.

Figure 10A:
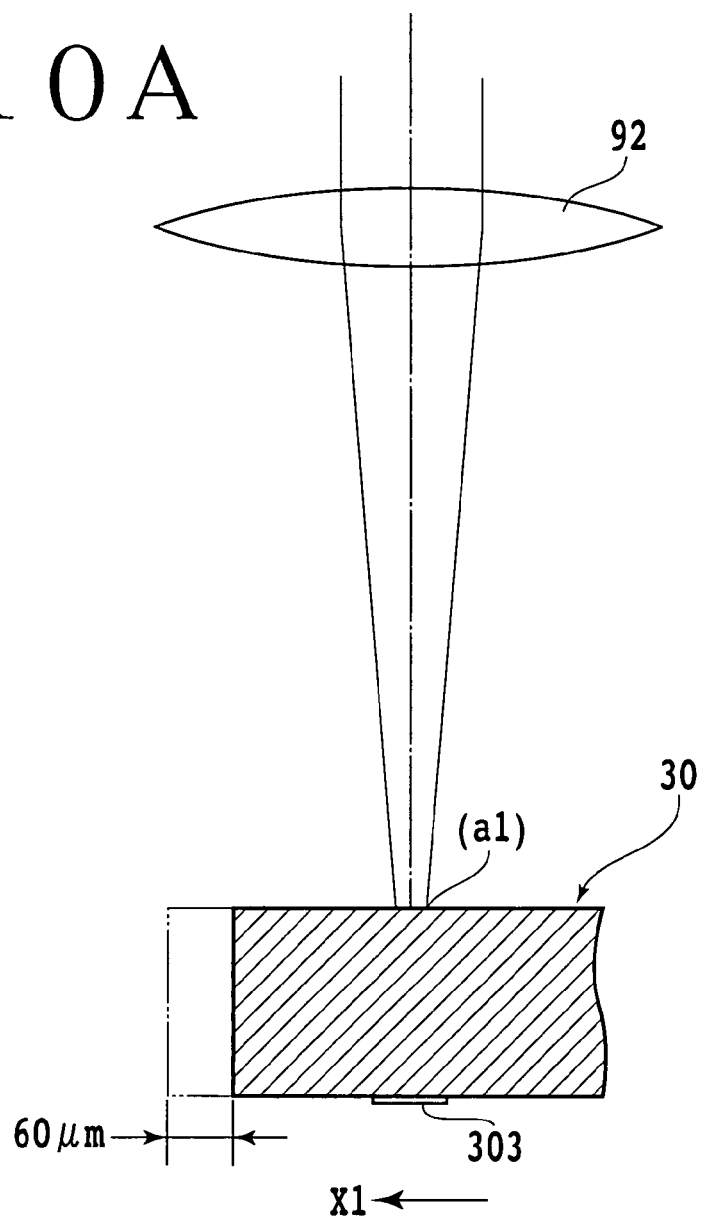
FIGS. 10A and 10B are explanatory views showing, in an enlarged scale, details of the perforation process shown in FIGS. 9A and 9B.

Here, a method of irradiating the pulse laser beam by 10 pulses at the first working feeding start position coordinate value (a1) of the semiconductor wafer 30 while the semiconductor wafer 30 is moving at the working feeding speed of 300 mm/sec is described with reference to FIG. 10. Since the cycle frequency of the pulse laser beam in the working conditions defined above is 50 kHz, the pulse laser beam is irradiated by 50,000 pulses for one second (50,000/sec). Accordingly, the period within which the pulse laser beam by 10 pulses is to be irradiated is ⅕,₀₀₀ second. On the other hand, the semiconductor wafer 30 which is moving in a direction indicated by X1 at the working feeding speed of 300 mm/second moves by a distance of 60 μm in ⅕,₀₀₀ second. Accordingly, the first deflection angle adjustment means 814 and the first output adjustment means 815 of the first acousto-optic deflection means 81 and the second deflection angle adjustment means 824 and the second output adjustment means 825 of the second acousto-optic deflection means 82 should be controlled such that, while the semiconductor wafer 30 moves by 60 μm, the laser beam irradiation apparatus 52 is operated while the condensed light point of the pulse laser beam is positioned at the first working feeding start position coordinate value (a1).

Figure 10B:
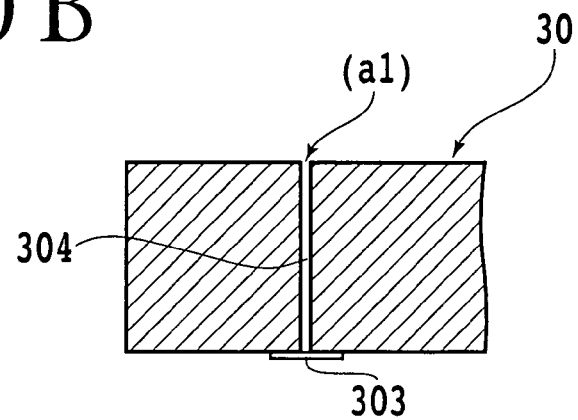

As described above, the irradiation method of the pulse laser beam can be performed by the control means 20 which controls, based on the detection signal from the reading head 374b of the working feeding amount detection means 374, the voltages to be applied to the first deflection angle adjustment means 814 and the first output adjustment means 815 of the first acousto-optic deflection means 81 and the second deflection angle adjustment means 824 and the second output adjustment means 825 of the second acousto-optic deflection means 82 as described above to control the frequency of the RF signal and power to be applied to the first acousto-optic device 811 of the first acousto-optic deflection means 81 and the second acousto-optic device 821 of the second acousto-optic deflection means 82. As a result, since, in a state in which the semiconductor wafer 30 is moving in the working feeding direction X1, the pulse laser beam providing 10 pulses can be irradiated at the position of the first working feeding start position coordinate value (a1), and a laser work hole 304 which extends down to the electrode 303 is formed at the first working feeding start position coordinate value (a1) of the semiconductor wafer 30 as seen in FIG. 10B. After the pulse laser beam provides 10 pulses and is irradiated at the first working feeding start position coordinate value (a1) in this manner, the control means 20 applies a voltage of 15 V to the first deflection angle adjustment means 814 of the first acousto-optic deflection means 81 and applies a RF signal of a frequency with a corresponding voltage of 15 V to the first acousto-optic device 811 so that the pulse laser beam oscillated from the pulse laser beam pulse laser beam oscillation means 6 is introduced to the laser beam absorption means 83 as indicated by a broken line in FIG. 2.

It is to be noted that, since, at the perforation step, a correction voltage is applied to the first output adjustment means 815 in response to the variation of the actual output power caused by deflection of the pulse laser beam in response to the voltages applied to the first deflection angle adjustment means 814 and the second deflection angle adjustment means 824, the actual output powers of the pulse laser beams deflected by the first acousto-optic device 811 and the second acousto-optic device 821 are equal to each other. Accordingly, in the laser working machine in the embodiment shown in FIG. 1, a laser work hole 304 which extends down to an electrode 303 can be worked accurately by irradiating the pulse laser beam by 10 pulses. If such working is performed without application of the correction voltage to the first output adjustment means 815, then since the diffraction efficiency by the first acousto-optic device 811 and the second acousto-optic device 821 varies, the actual outputs of the pulse laser beams deflected by the first acousto-optic device 811 and the second acousto-optic device 821 vary. Consequently, even if the pulse laser beam is irradiated by 10 pulses, the laser work hole may not extend to the electrode 303 or else the pulse laser beams may strike the electrode 303.

Figure 9B:
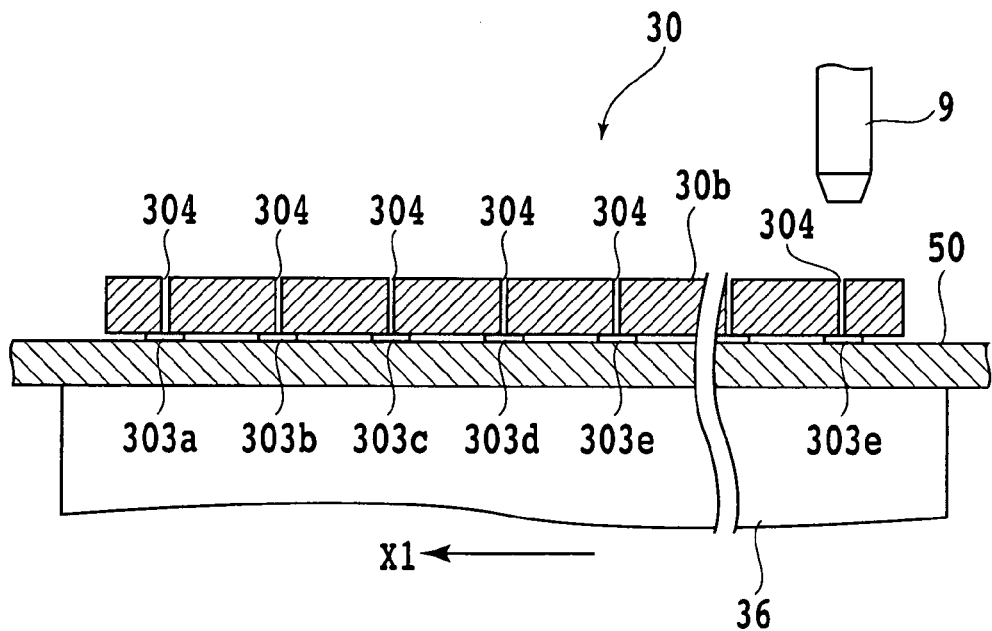

On the other hand, the control means 20 receives a detection signal from the reading head 374b of the working feeding amount detection means 374 and counts the detection signal by means of the counter 204. Then, if the count value by the counter 204 reaches a value corresponding to the distance A between the electrodes 303 in the X-axis direction in FIG. 3, then the control means 20 controls the laser beam irradiation apparatus 52 to carry out the perforation step. Also thereafter, every time the count value by the counter 204 reaches the distance A or B of electrodes 303 in the X-axis direction in FIG. 6, the control means 20 renders the laser beam irradiation apparatus 52 operative to carry out the perforation step. Then, after the perforation step is carried out at the position of the rightmost electrode 303e in FIG. 9B among the electrodes 303 formed on the rightmost device 302 in the E1th row of the semiconductor wafer 30 as seen in FIG. 9B, the operation of the working feeding means 37 is stopped to stop the movement of the chuck table 36. As a result, the laser work holes 304 are formed at the positions of the electrodes 303 (not shown) in the semiconductor wafer 30 as seen in FIG. 9B.

Figure 11A:
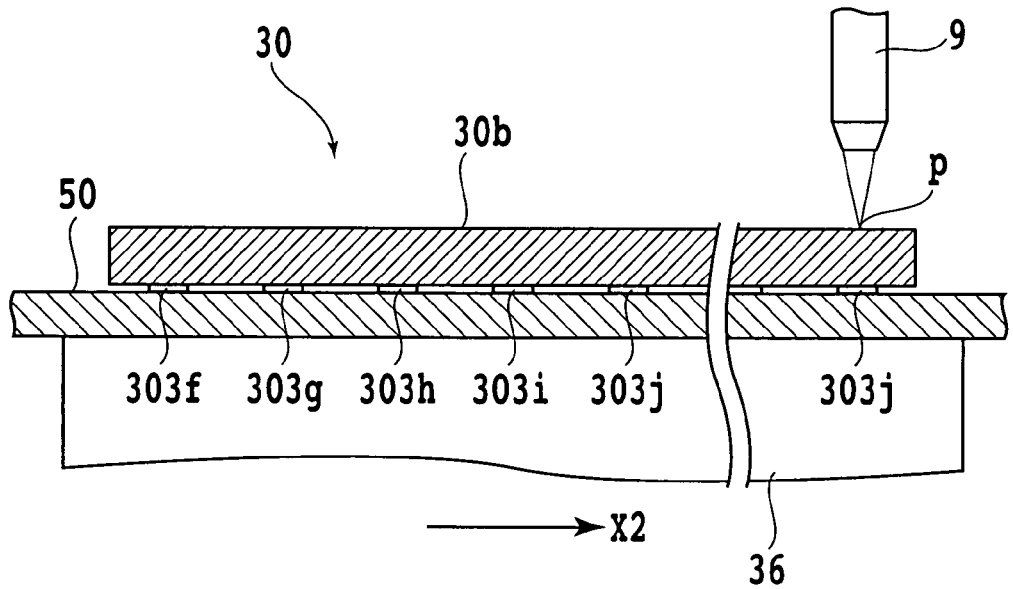
FIGS. 11A and 11B are explanatory views showing another perforation process carried out by the laser working machine shown in FIG. 1.

Then, the control means 20 controls the first indexing feeding means 38 such that the condenser 9 of the laser beam irradiation apparatus 52 is fed for indexing in a direction perpendicular to the plane of FIG. 9B. Meanwhile, the control means 20 receives a detection signal from the reading head 384b of the indexing feeding amount detection means 384 as an input thereto and counts the detection signal by means of the counter 204. Then, if the count value by the counter 204 reaches a value corresponding to the distance C between the electrodes 303 in the Y-axis direction in FIG. 6, then the control means 20 stops the operation of the first indexing feeding means 38 thereby to stop the indexing feeding of the condenser 9 of the laser beam irradiation apparatus 52. As a result, the condenser 9 is positioned immediately above the electrode 303j (refer to FIG. 6) opposing to the electrode 303e. This state is illustrated in FIG. 11A.

Figure 11B:
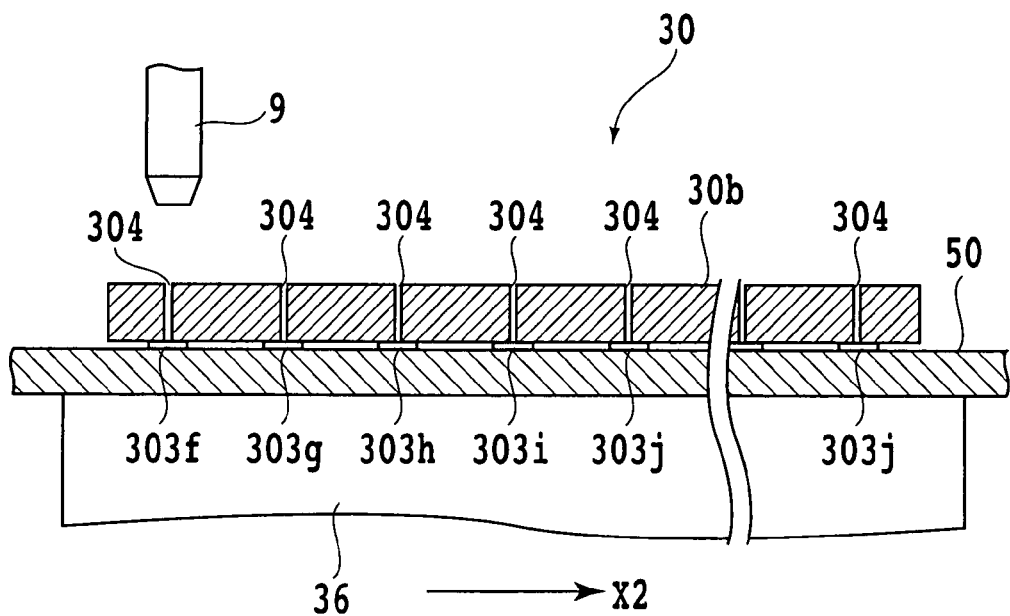

In the state illustrated in FIG. 11A, the control means 20 controls the working feeding means 37 so as to perform working feeding of the chuck table 36 at a predetermined moving speed in a direction indicated by an arrow mark X2 in FIG. 11A and simultaneously renders the laser beam irradiation apparatus 52 operative to carry out the perforation step described hereinabove. Then, the control means 20 counts the detection signal from the reading head 374b of the working feeding amount detection means 374 by means of the counter 204 as described hereinabove. Then, every time the count value of the counter 204 reaches the distance A or B between the electrodes 303 in the X-axis direction in FIG. 6, the control means 20 renders the laser beam irradiation apparatus 52 operative to carry out the perforation step. Then, after the perforation step is carried out at the position of the electrode 303f formed on the rightmost device 302 of the semiconductor wafer 30 as seen in FIG. 11B, the control means 20 stops the operation of the working feeding means 37 thereby to stop the movement of the chuck table 36. As a result, the laser work holes 304 are formed at the positions of the electrodes 303 (not shown) in the semiconductor wafer 30 as seen in FIG. 11B.

After the laser work holes 304 are formed at the positions of the electrodes 303 formed on the devices 302 in the E1th row of the semiconductor wafer 30 in such a manner as described above, the control means 20 renders the working feeding means 37 and the first indexing feeding means 38 operative so that the second working feeding start position coordinate value (a2) stored in the random access memory (RAM) 203 corresponding to the electrodes 303 formed on the devices 302 in the E2th row of the semiconductor wafer 30 is positioned immediately below the condenser 9 of the laser beam irradiation apparatus 52. Then, the control means 20 controls the laser beam irradiation apparatus 52, working feeding means 37 and first indexing feeding means 38 to carry out the above-described perforation step at the position of the electrode 303 formed on the device 302 in the E2th row of the semiconductor wafer 30. Thereafter, the perforation step described above is carried out also for portions of the semiconductor wafer 30 at the positions of the electrodes 303 formed on the devices 302 in the E3th to Enth rows. As a result, the laser work holes 304 are formed at the portions of the semiconductor wafer 30 at all of the electrodes 303 formed on the devices 302 of the semiconductor wafer 30.

It is to be noted that, at the perforation step, the pulse laser beam is not irradiated upon the semiconductor wafer 30 in the regions of the distance A and the distance B in the X-axis direction in FIG. 6. In order that the pulse laser beam is not irradiated upon the semiconductor wafer 30 in this manner, the control means 20 applies the voltage of 15 V to the first deflection angle adjustment means 814 of the first acousto-optic deflection means 81. As a result, a RF signal of a frequency with a corresponding voltage of 15 V is applied to the first acousto-optic device 811, and the pulse laser beam (LB) oscillated from the pulse laser beam oscillation means 6 is introduced to the laser beam absorption means 83 as indicated by a broken line in FIG. 2. Consequently, the pulse laser beam is not irradiated upon the semiconductor wafer 30.

Figure 12A:
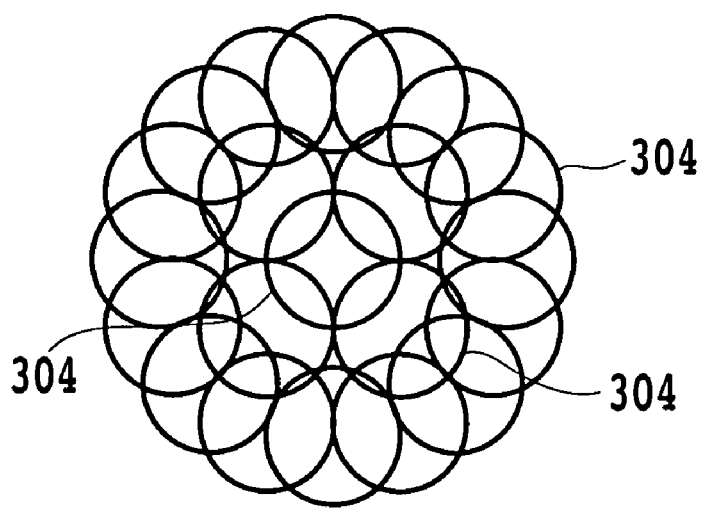
FIGS. 12A and 12B are explanatory views showing a different laser working method carried out by the laser working machine shown in FIG. 1.
Figure 12B:
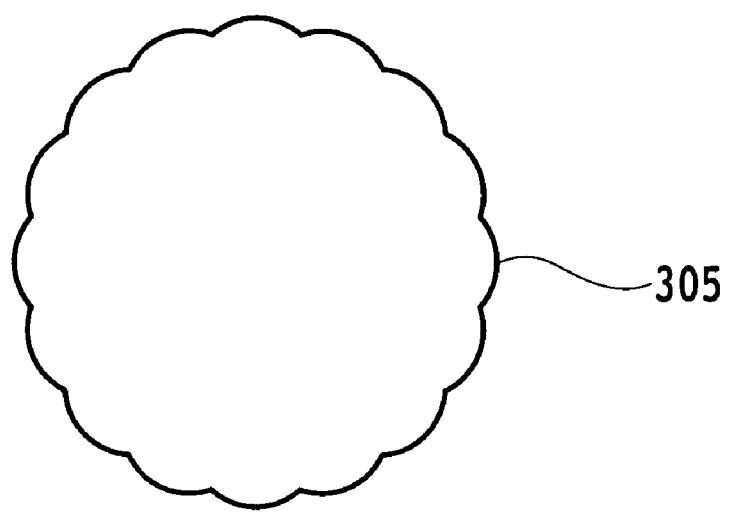

Another embodiment in which the first acousto-optic deflection means 81 and the second acousto-optic deflection means 82 of the laser beam irradiation apparatus 52 described herein above are rendered operative to perform laser working is described with reference to FIGS. 12A and 12B. In particular, in a condition in which a work held on the chuck table 36 is being fed for working, the first acousto-optic deflection means 81 and the second acousto-optic deflection means 82 are rendered operative to deflect the pulse laser beam in the X-axis direction and the Y-axis direction while the output power of the pulse laser beam is adjusted and the pulse laser beam of the adjusted output power is irradiated upon the work to perform two-dimensional working such as trepanning to successively form laser work holes 304 as seen in FIG. 12A. As a result, a hole 305 of a desired size can be formed as seen in FIG. 12B.

At this time, correction voltages illustrated in FIG. 4 are applied to the first output adjustment means 815 of the first acousto-optic deflection means 81 and the second deflection angle adjustment means 824 of the second acousto-optic deflection means 82 in response to control voltages to be applied to the first deflection angle adjustment means 814 of the first acousto-optic deflection means 81 and the second deflection angle adjustment means 824 of the second acousto-optic deflection means 82. Consequently, even if the diffraction efficiency by the first acousto-optic device 811 and the second acousto-optic device 821 varies, the actual output powers of the pulse laser beam deflected by the first acousto-optic device 811 and the second acousto-optic device 821 are equal to each other. Consequently, uniform working can be carried out at all irradiation positions of the pulse laser beams.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A laser beam irradiation apparatus, comprising:

laser beam oscillation means for generating a laser beam;

first acousto-optic deflection means for deflecting the laser beam generated by said laser beam oscillation means, said first acousto-optic deflection means including a first acousto-optic device for deflecting the laser beam generated by said laser beam oscillation means, a first RF signal oscillator for applying a RF signal to said first acousto-optic device, first deflection angle adjustment means for adjusting the frequency of the RF signal to be outputted from said first RF oscillator, and first output adjustment means for adjusting the amplitude of the RF signal to be produced by said first RF oscillator;

second acousto-optic deflection means for deflecting the laser beam generated by said laser beam oscillation means, said second acousto-optic deflection means including a second acousto-optic device for deflecting the laser beam generated by said laser beam oscillation means, a second RF signal oscillator for applying a RF signal to said second acousto-optic device, second deflection angle adjustment means for adjusting the frequency of the RF signal to be outputted from said second RF oscillator, and second output adjustment means for adjusting the amplitude of the RF signal to be produced by said second RF oscillator;

control means for controlling said first and second deflection angle adjusting means and said first and second output adjusting means;

a condenser for condensing the laser beam deflected by said first and second acousto-optic deflection means; and laser beam output detection means including a beam splitter disposed between said first and second acousto-optic devices and said condenser for splitting part of the laser beam deflected by said first and second acousto-optic devices and a light reception device for receiving the laser beam split by said beam splitter, said laser beam output detection means sending a light reception signal received by said light reception device to said control means;

said control means determining an actual output power of the laser beam based on the light reception signal sent thereto from said laser beam output detection means in response to a control signal for controlling said first and second deflection angle adjustment means, arithmetically calculating a ratio of an actual output power when a first voltage is applied to said first reflection angle adjusting means of said first acousto-optic deflection means and a second voltage is applied to said second reflection angle adjusting means of said second acousto-optic deflection means, as compared to a maximum output power, determining a minimum ratio of the actual output power, arithmetically calculating a correction value based on the calculated ratio of the actual output power and the minimum ratio of the actual output power to produce a control map and controlling said first and second output adjusting means based on the control map.

2. A laser working machine, comprising:

a chuck table configured to hold a work;

laser beam irradiation means for irradiating a laser beam on the work held by said chuck table;

working feeding means for relatively moving said chuck table and said laser beam irradiation means in a working feeding direction which is an X-axis direction; and indexing feeding means for relatively moving said chuck table and said laser beam irradiation means in an indexing feeding direction which is a Y-axis direction orthogonal to the working feeding direction which is the X-axis direction;

said laser beam irradiation means being formed from a laser beam irradiation apparatus according to claim 1.

* * * * *